(12) United States Patent
Akada et al.

(10) Patent No.: US 9,097,300 B2
(45) Date of Patent: Aug. 4, 2015

(54) DRUM BRAKE TYPE ELECTRIC PARKING BRAKE APPARATUS

(71) Applicant: AKEBONO BRAKE INDUSTRY CO., LTD., Tokyo (JP)

(72) Inventors: Hironori Akada, Tokyo (JP); Hiroyasu Ishikawa, Tokyo (JP); Michio Suzuki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 13/944,998

(22) Filed: Jul. 18, 2013

(65) Prior Publication Data

US 2014/0027221 A1    Jan. 30, 2014

(30) Foreign Application Priority Data

Jul. 27, 2012   (JP) ................. 2012-166614

(51) Int. Cl.
| F16D 65/14 | (2006.01) |
| B60T 13/74 | (2006.01) |
| F16D 51/20 | (2006.01) |
| F16D 51/50 | (2006.01) |
| F16D 65/22 | (2006.01) |
| F16D 63/00 | (2006.01) |
| F16D 121/24 | (2012.01) |
| F16D 125/40 | (2012.01) |
| F16D 125/48 | (2012.01) |
| F16D 125/60 | (2012.01) |
| F16D 125/68 | (2012.01) |

(52) U.S. Cl.
CPC ............... *F16D 51/20* (2013.01); *F16D 51/50* (2013.01); *F16D 65/22* (2013.01); *F16D 63/004* (2013.01); *F16D 2121/24* (2013.01); *F16D 2125/40* (2013.01); *F16D 2125/48* (2013.01); *F16D 2125/60* (2013.01); *F16D 2125/68* (2013.01)

(58) Field of Classification Search
USPC ................. 188/2 D, 156, 325–341; 74/89.23
See application file for complete search history.

(56) References Cited

U.S. PATENT DOCUMENTS

| 6,446,768 B2 * | 9/2002 | Kikuta et al. ................. 188/162 |
| 6,513,632 B2 * | 2/2003 | Peter .............................. 188/162 |
| 6,655,506 B2 * | 12/2003 | Pfeil et al. ..................... 188/156 |
| 8,011,482 B2 * | 9/2011 | Boyle et al. ................... 188/2 D |
| 8,051,956 B2 * | 11/2011 | Huang et al. .................. 188/2 D |
| 8,235,181 B2 * | 8/2012 | Sano et al. ..................... 188/2 D |
| 2006/0289248 A1 * | 12/2006 | Noh .............................. 188/2 D |
| 2013/0087418 A1 * | 4/2013 | Han ............................... 188/78 |

FOREIGN PATENT DOCUMENTS

| JP | 2001-504417 A | 4/2001 |
| WO | WO-98/45152 A1 | 10/1998 |

* cited by examiner

*Primary Examiner* — Christopher Schwartz
(74) *Attorney, Agent, or Firm* — Drinker Biddle & Reath LLP (57) ABSTRACT

A drum brake type electric parking brake apparatus includes an electric actuator unit configured to pull a cable so as to expand an expanding mechanism, a pulling pipe into which the cable is loosely inserted and supported so as to move in an axial direction, a feeding nut supported so as to move in only a rotation direction and provided with a female screw which is engaged with a male screw on the pulling pipe, and a connecting unit connecting a base end of the pulling pipe and a base end of the cable so as to pull the cable in a direction away from the expanding mechanism with the pulling pipe. The base end of the cable is projected from the base end of the pulling pipe which is an end opposite to the expanding mechanism.

3 Claims, 8 Drawing Sheets

DRUM BRAKE TYPE ELECTRIC PARKING BRAKE APPARATUS

BACKGROUND

The present invention relates to an improvement of a drum brake type electric parking brake apparatus which expands a distance between one pair of brake shoes with an electric motor to produce a braking force. In particular, the present invention is to realize a simple structure which improves a smoothness of a braking when the braking is started or cancelled by smoothing an operation of a part which transmits an output of an electric actuator unit to an expanding mechanism for expanding the distance between one pair of brake shoes.

The drum brake type electric parking brake apparatus of the present invention includes a drum-in disc brake for which a service brake is carried out by a disc brake, and only a parking brake is carried out by a drum brake, as well as the structure in which drum brakes are used both in the service brake for decelerating or even stopping a vehicle from a running state and in the parking brake for keeping a stopped state.

A parking brake which maintains a vehicle at a stopped state while a brake pedal is not pressed is typically incorporated in a drum brake. Further, it is known from those described, for example, in a patent document 1 that in some vehicles the parking brake is performed mechanically (not hydraulically) through a boosting mechanism such as link mechanisms like a toggle mechanism while an electric motor is a driving source. In this patent document 1, a structure is described in which a hydraulic disc brake is used as the service brake, and a mechanical drum brake, in which an electric motor is a driving source, is used as the parking brake.

The drum brake type electric parking brake apparatus described in the patent document 1 is so configured that the distance between a pair of brake shoes, which are supported at an outer side surface of a backing plate to be displaceable in a radial direction of the backing plate, is expanded with an electric actuator unit. This electric actuator unit is made by combining the electric motor, a gear type speed reducer and a feeding screw type rotation linear movement converting device, and when the electric motor is electrified, a rod of the rotation linear movement converting device is moved by a large force in a linear direction, and a cable is pulled by the rod. The distance between one ends of the two brake shoes in the circumferential direction is expanded by this cable and an expanding mechanism such as the link mechanism.

Figure 1:
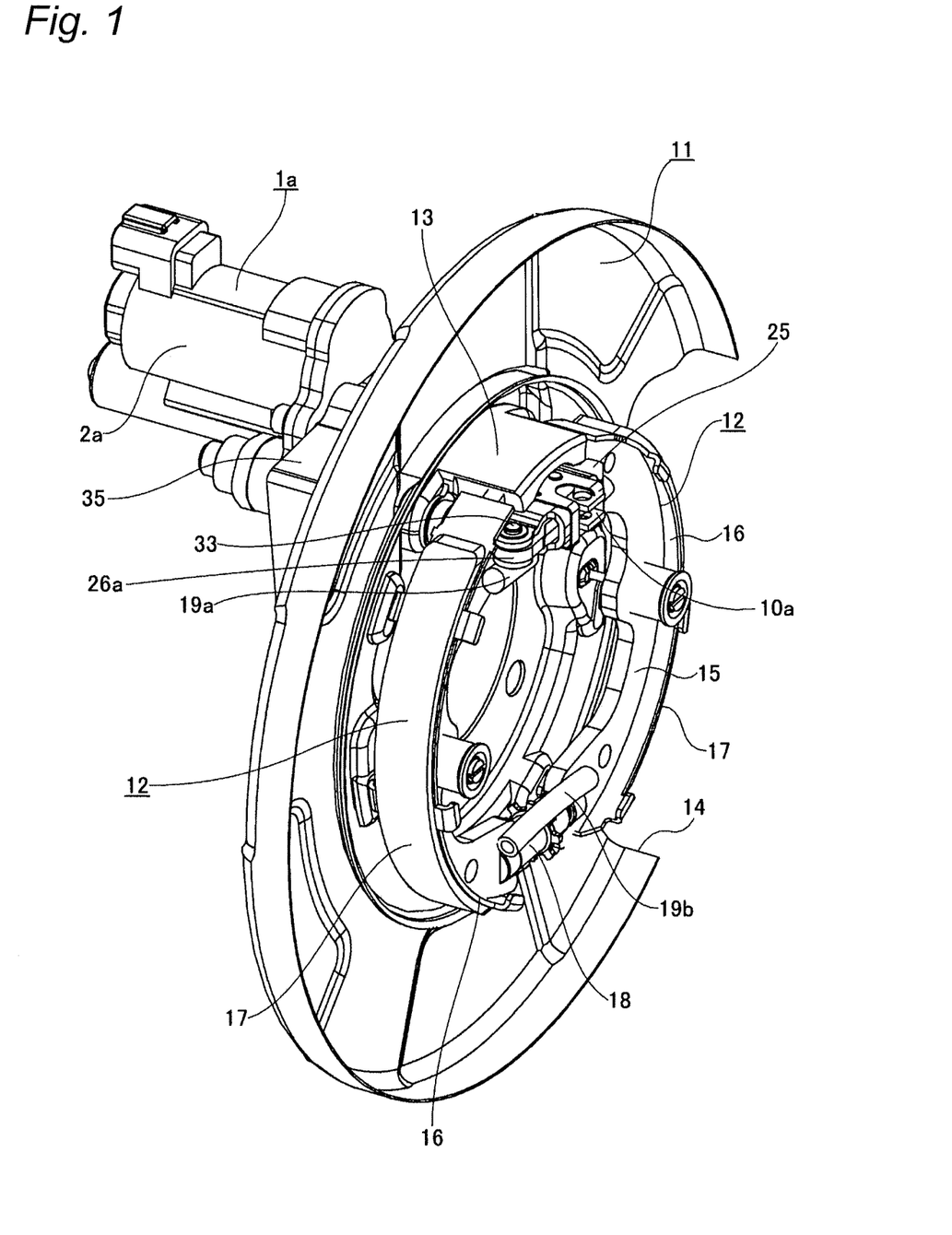
FIG. 1 is a perspective view which shows a first embodiment of the invention, except a drum, which is seen from the outer side and an outer side in the radial direction.
Figure 2:
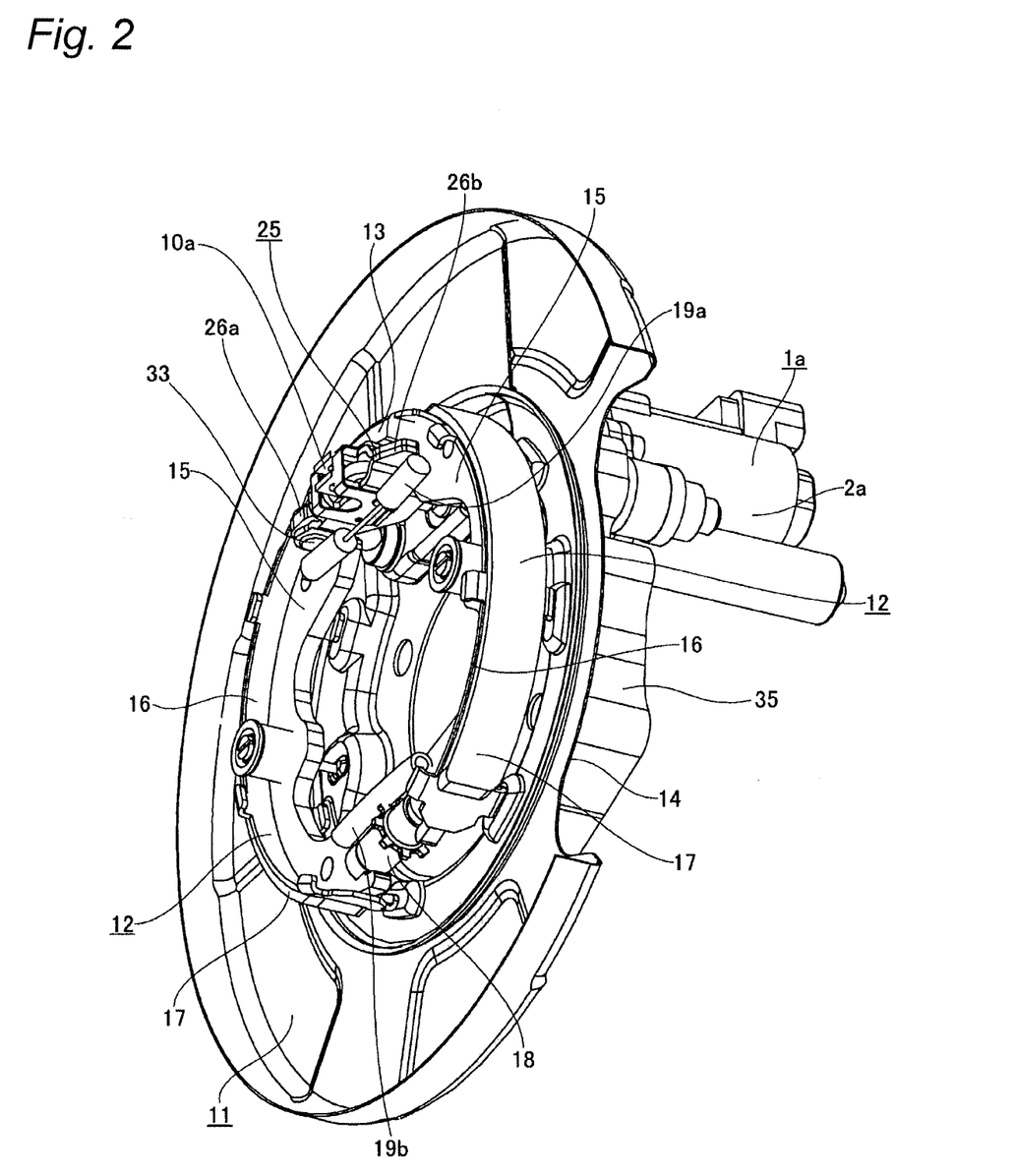
FIG. 2 is a perspective view which shows the first embodiment which is seen from a side opposite to that in FIG. 1 in the radial direction.
Figure 3:
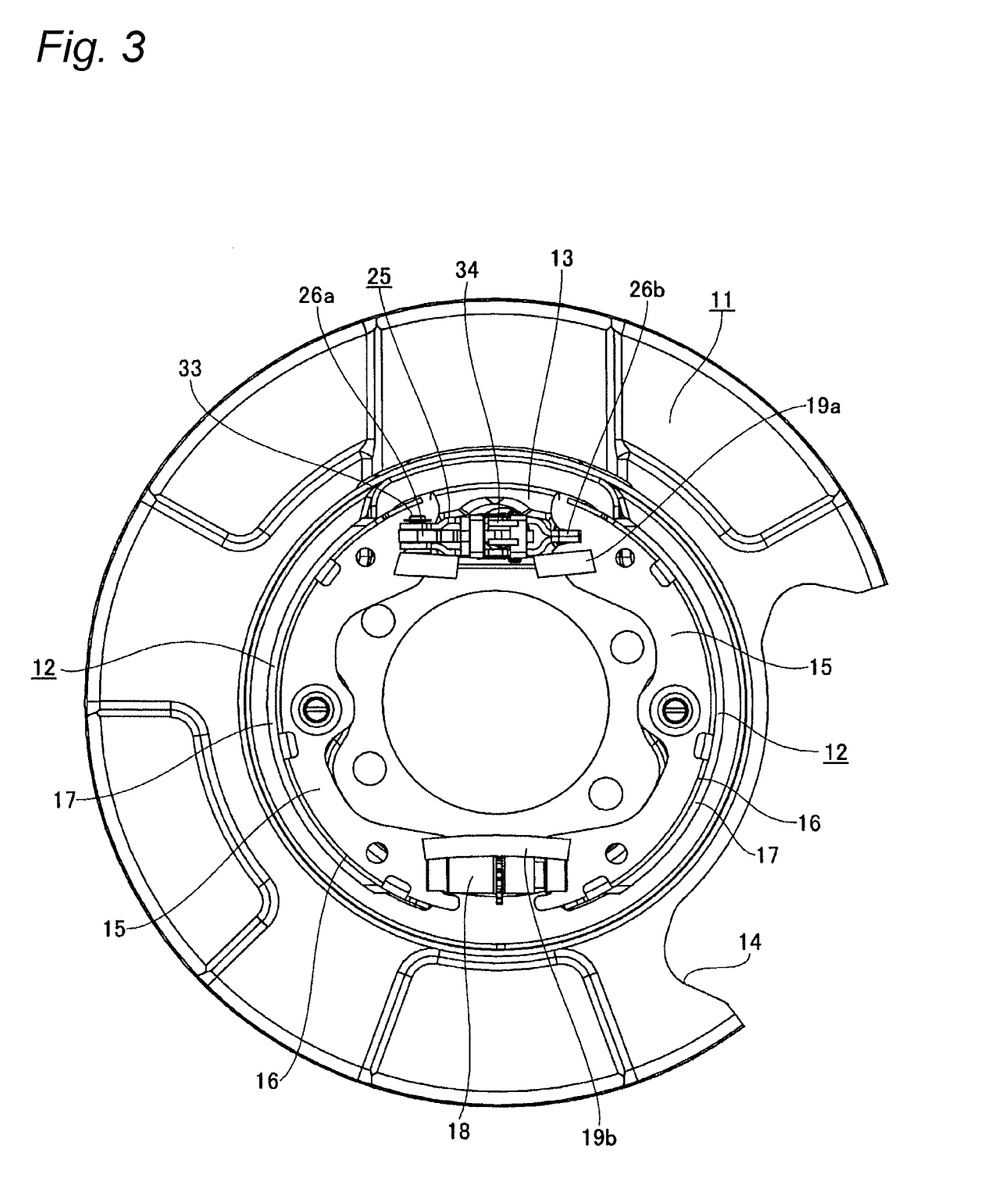
FIG. 3 is an orthographic projection view which shows the first embodiment which is seen from the outer side.
Figure 4:
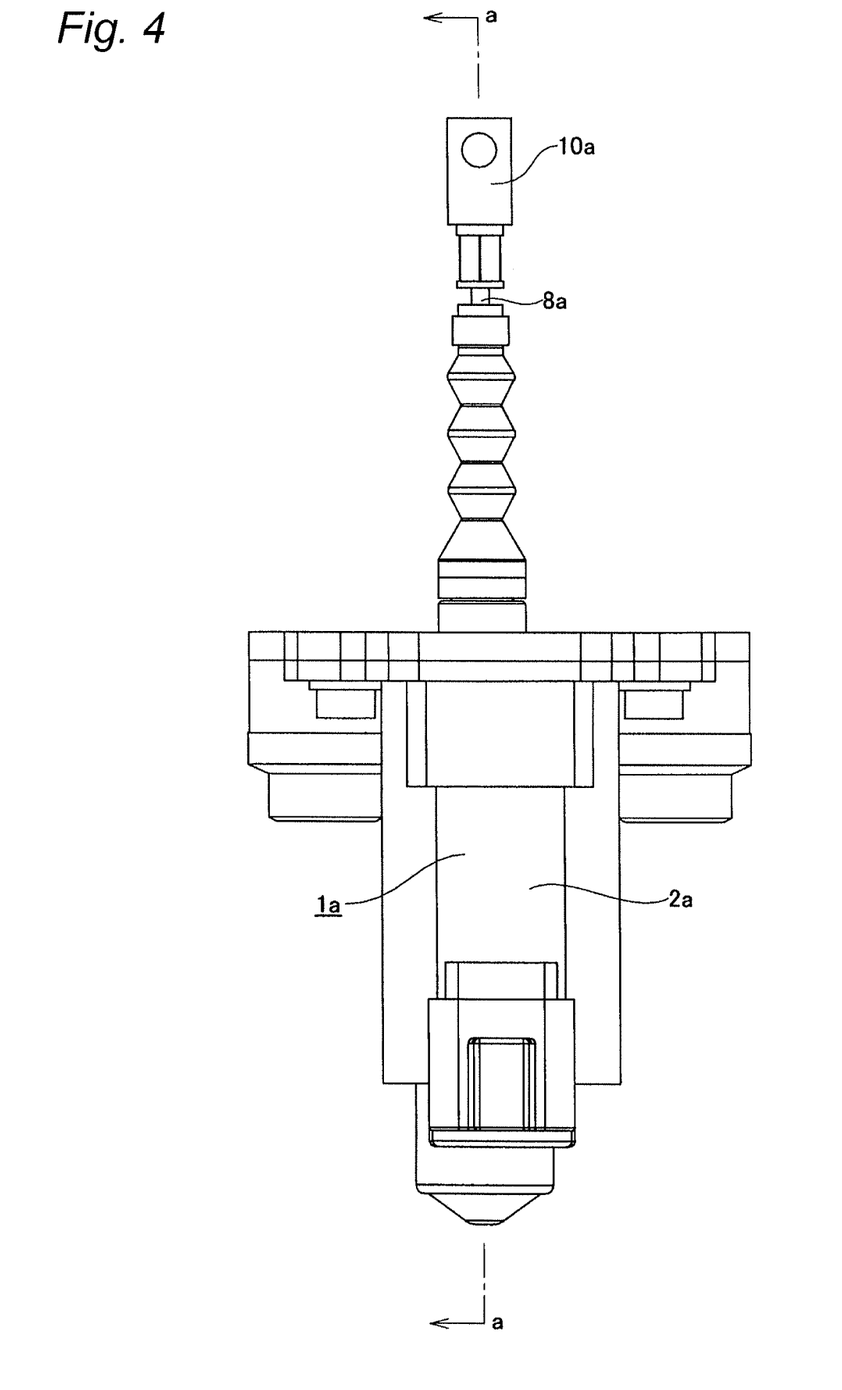
FIG. 4 is a front view which shows an electric actuator unit and a connector that are taken out.
Figure 5:
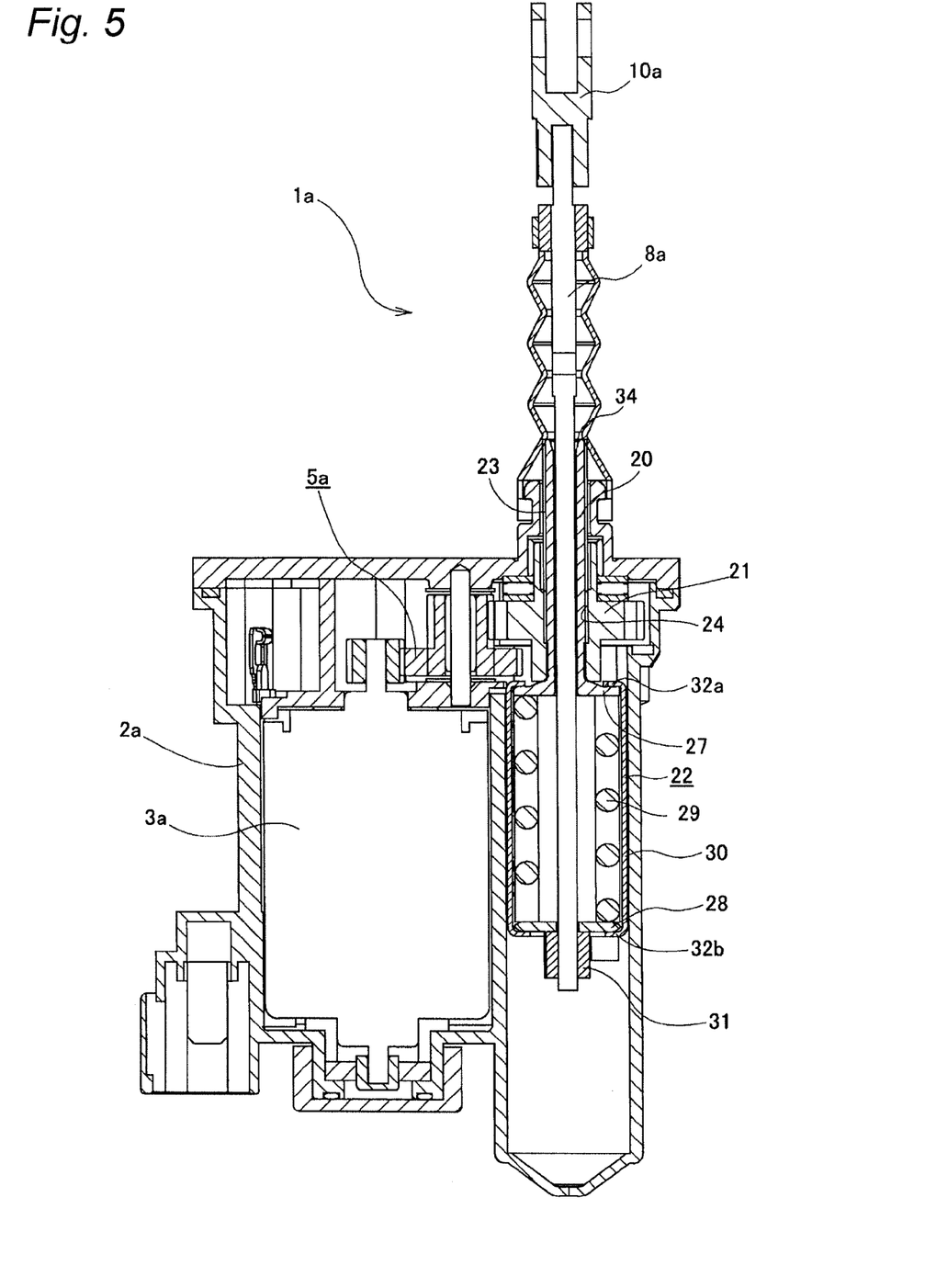
FIG. 5 is a sectional view in an a-a line shown in FIG. 4.
Figure 6:
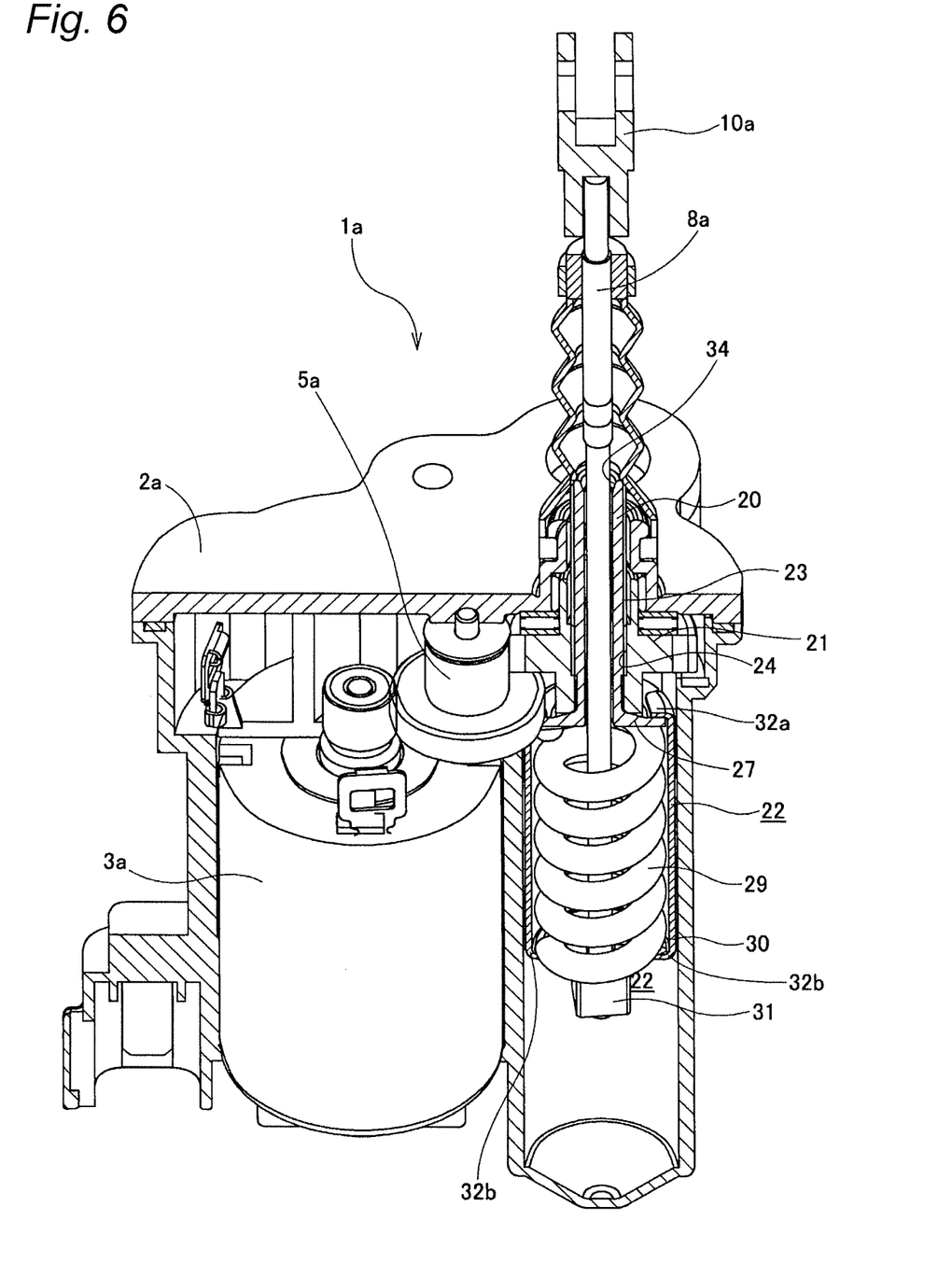
FIG. 6 is a perspective view which shows the electric actuator unit and the connector of FIG. 5 which are seen from obliquely above.
Figure 7:
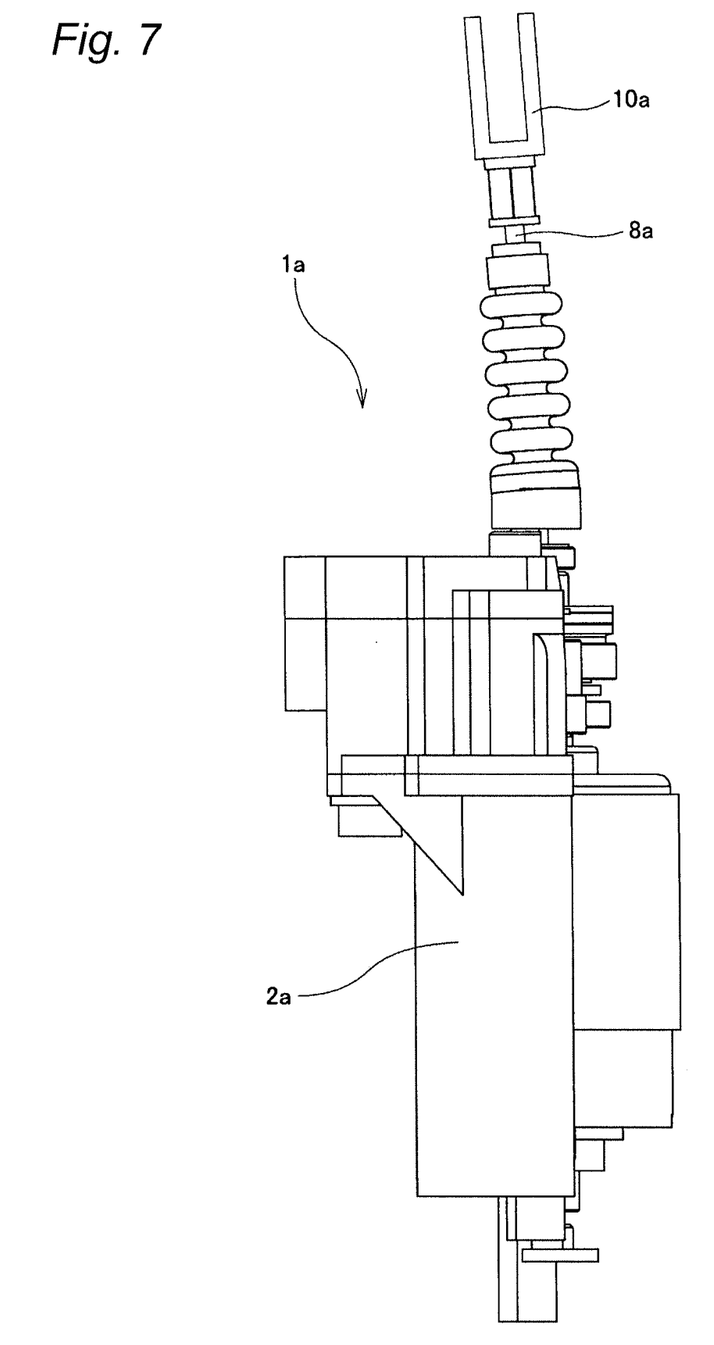
FIG. 7 is an orthographic projection view which shows the electric actuator unit and the connector that are seen from the left side in FIG. 4.
Figure 8:
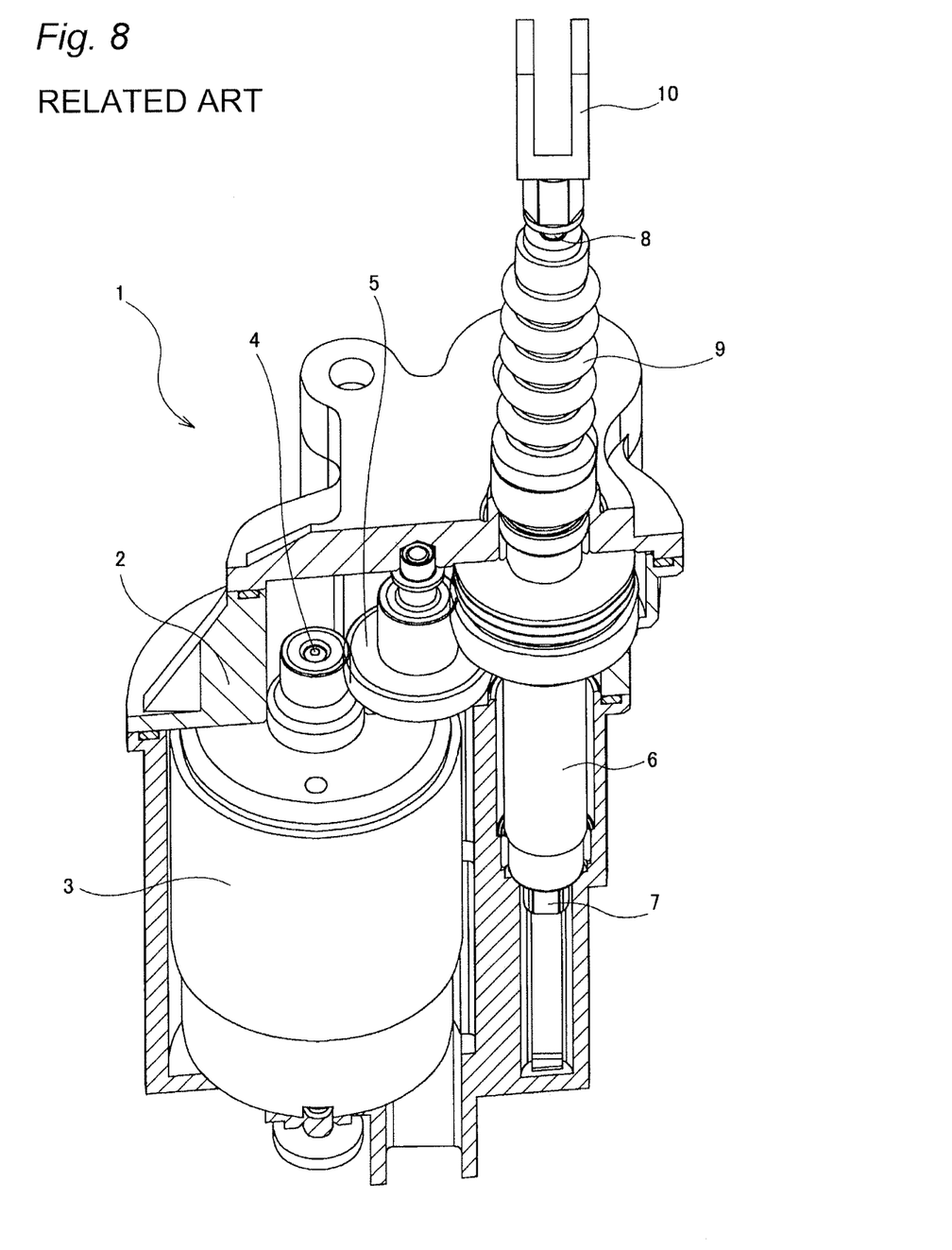
FIG. 8 is a figure like FIG. 6 which shows a structure that is considered earlier.

FIG. 8 shows an electric actuator unit 1 which is considered by this inventor earlier and is different from the structure described in the patent document 1. In this electric actuator unit 1, the rotation of an output shaft 4 of an electric motor 3 installed in an actuator case 2 is transmitted to a screw pipe 6 through a gear type speed reducer 5. The screw pipe 6 is supported in the actuator case 2 to be only rotatable, and a female screw is formed on the inner circumferential surface of the screw pipe 6. A male screw formed on the outer circumferential surface of a rod 7 is threadedly engaged with the female screw of the screw pipe 6. The rod 7 is provided in the actuator case 2 to be only movable in the axial direction of the rod 7. The base end of the cable 8 is attached and fixed to the distal end of the rod 7 which projects from an opening at the distal end of the screw pipe 6. Furthermore, a bifurcated connector 10 is attached to a part projecting from a dustproof boot 9 at the distal end of the cable 8. When the electric actuator unit 1 is incorporated in a parking brake, the actuator case is supported by and fixed to a fixed part such as a backing plate or a knuckle, and the connector 10 is pivotally supported by a part of the component members of the expanding mechanism.

At the time of braking, the electric motor 3 is energized, and because of the threaded engagement of the female screw on the inner circumferential surface of the screw pipe 6 and the male screw on the outer circumferential surface of the rod 7, the rod 7 is moved linearly in a direction away from the expanding mechanism. The cable 8 is pulled by the rod 7 and the expanding mechanism is extended to expand the distance between the pair of brake shoes so that the linings of these two brake shoes are pressed against the inner circumferential surface of a drum and a braking force is produced.

In the case of the above described electric actuator unit 1, the full length of the cable 8 between the distal end of the rod 7 and the connector 10 cannot be provided enough. On the other hand, a part which is connected to the connector 10, as a part of the component members of the expanding mechanism, moves arcuately with the expansion and contraction of the expanding mechanism. Therefore, to make this arcuate movement smooth, it is desirable to lengthen the full length of the cable 8 as much as possible to ensure the flexibility of the cable 8 (easiness to flex). From this aspect, there is a room for the improvement of the structure shown in FIG. 8.

In the patent document 2, a structure is described in which a plurality of link arms are combined to absorb a difference between the linear movement of one end of a rod that constructs an electric actuator unit and the arcuate movement of a part of the component members of the expanding mechanism. According to such a structure, the difference can be absorbed sufficiently, but it cannot be avoided that the structure is complicated and the cost increases.

[Patent document 1] JP 2001-504417 A
[Patent document 2] U.S. Pat. No. 8,011,482 B

SUMMARY

It is therefore one advantageous aspect of the present invention to provide a drum brake type electric parking brake apparatus with a simple structure which improves the smoothness of a braking when the braking is started or cancelled by smoothing the operation of a part which transmits the output of an electric actuator unit to an expanding mechanism for expanding the distance between one pair of brake shoes.

According to one aspect of the invention, there is provided a drum brake type electric parking brake apparatus for pressing linings of brake shoes against an inner circumferential surface of a drum so as to produce a braking force by expanding an expanding mechanism provided between the brake shoes, the drum brake type electric parking brake apparatus comprising:

an electric actuator unit configured to pull a cable by a speed reducer so as to expand the expanding mechanism, the speed reducer configured to reduce a speed of a rotation of an output shaft of an electric motor provided in an actuator case and to convert the rotation into a linear movement;

a pulling pipe, having a circular tube shape into which the cable is loosely inserted, provided with a male screw on an outer circumferential surface, and supported in the actuator case so as to move in an axial direction thereof;

a feeding nut, provided as a part of components of the speed reducer, supported in the actuator case so as to move in only a rotation direction thereof, and provided with a female screw on an inner circumferential surface which is engaged with the male screw on the outer circumferential surface of the pulling pipe; and a connecting unit, connecting a base end of the pulling pipe and a base end of the cable so as to pull the cable in a direction away from the expanding mechanism with a movement of the pulling pipe in the same direction, the base end of the pulling pipe being an end opposite to the expanding mechanism, and the base end of the cable being projected from the base end of the pulling pipe.

The drum brake type electric parking brake apparatus may be configured such that: the connecting unit comprises: an outward flange-like flange part provided at the base end of the pulling pipe; a receiving plate supported at the base end of the cable while being prevented from being displaced in the direction away from the expanding mechanism; a compression spring provided between the receiving plate and the flange part; and a spring cover surrounding the compression spring, and two end parts of the spring cover are respectively engaged to the receiving plate and the flange part so as to prevent a distance between the receiving plate and the flange part from expanding longer than a predetermined value.

The drum brake type electric parking brake apparatus may be configured such that: one of the two end parts of the spring cover is engaged to a surface of the receiving plate in an opposite side of the expanding mechanism, and the other of the two end parts of the spring cover is engaged to a surface of the flange part in a side of the expanding mechanism.

DETAILED DESCRIPTION OF EXEMPLIFIED EMBODIMENTS

FIGS. 1 to 7 show one embodiment of the present invention. The structure of this embodiment is shown when the present invention is applied to a drum-in disc brake. The drum brake type electric parking brake apparatus of this embodiment includes a backing plate 11, a pair of brake shoes 12, 12, a drum (not shown in the figure), an anchor 13 and an electric actuator unit 1a. The backing plate 11 is threadedly fixed to the outer side surface of a knuckle which constructs a suspension system.

The backing plate 11 is formed into a roughly circular wheel shape with a part near the outer periphery being cut by forging a metal plate having enough strength and rigidity such as a steel plate, and the flexural rigidity is improved by forming a bended part at the outer fringe part, and forming stepped parts at main parts. A cut part 14 which is formed at a part near the outer periphery is formed to arrange a support or a caliper that constructs a disc brake which is a service brake. The backing plate 11 having such a construction is attached and fixed to a frame member 35 of the knuckle with a plurality of (for example, about four) bolts.

Each of the two brake shoes 12, 12 includes a web 15 of a roughly crescent shape, a back plate 16 which is fixed along the outer fringe of the web 15, and a lining 17 which is affixed and fixed to the outer circumferential surface of the back plate 16. The two brake shoes 12, 12 each of which has such a construction are supported on the outer side surface of the backing plate 11 to be displaceable in the radial direction of the backing plate 11. A duo servo type structure is used in this embodiment as a drum brake constructing a parking brake. Therefore, one end edges of the webs 15, 15 of the two brake shoes 12, 12 in the circumferential direction (upper side circumferential end surfaces in FIGS. 1 to 3) abut against or closely oppose to the two end surfaces in the circumferential direction of the anchor 13 which is fixed to the outer side surface of the backing plate 11. The one end edges of the webs 15, 15 abut against the two end surfaces in the circumferential direction of the anchor 13 at the anchor side at the time of non-braking and braking, and closely oppose the two end surfaces in the circumferential direction of the anchor 13 at the anti-anchor side at the time of braking. The other end edges of the webs 15, 15 of the two brake shoes 12, 12 in the circumferential direction (lower side circumferential end surfaces in FIGS. 1 to 3) abut against two end surfaces of a floating anchor 18 in the axial direction. Return springs 19a, 19b are between the webs 15, 15 of the two brake shoes 12, 12 to apply elastic forces inwards in the radial direction (the braking cancellation direction) onto the two brake shoes 12, 12.

The drum is provided to surround the two brake shoes 12, 12 while being attached and fixed to a rotation side flange of a hub unit supported by the knuckle, and rotates together with a wheel. Because the structure of this embodiment is a drum-in disc brake, a disc which is provided integrally with the drum at the side of the outer periphery of the drum is used. One pair of pads supported by the support or the caliper that is placed at the cut part 14 of the backing plate 11 is placed in a state of holding the disc from two sides in the axial direction. When the service brake operates, the disk is strongly pinched by the pads from two sides. The anchor 13 is supported and fixed by a plurality of groups of bolts and nuts to a part between the one end parts in the circumferential direction of the two brake shoes 12, 12 as one part of the outer side surface of the backing plate 11.

The electric actuator unit 1a is made by incorporating an electric motor 3a, a gear type speed reducer 5a, a pulling pipe 20, a feeding nut 21 and a connecting unit 22 in an actuator case 2a. The pulling pipe 20 has a circular tube shape, has an inside diameter which is larger than the outer diameter of a cable 8a to be described below, and is supported in the actuator case 2a to be only displaceable in the axial direction (upward/downward direction of FIGS. 4 to 7). In other words, the pulling pipe 20 is supported in a state of being prevented from rotating. On the outer circumferential surface of the pulling pipe 20, a male screw 23 is formed from a part of the middle part near the base end thereof to a part near the distal end. The base end of the pulling pipe 20 is an end near the lower end in FIGS. 5 and 6, and the distal end is an end near the upper end in FIGS. 5 and 6. The feeding nut 21 is provided integrally with a gear which constructs the final section of the gear type speed reducer 5a, and is supported in the actuator case 2a to be only rotatable. The male screw 23 on the outer circumferential surface of the pulling pipe 20 is threadedly engaged with a female screw 24 that is provided in the center of the feeding nut 21 in a state of penetrating the feeding nut 21 in the axial direction. Therefore, when the electric motor 3a is energized, if the feeding nut 21 is rotated through the gear type speed reducer 5a, the pulling pipe 20 can be displaced in the axial direction.

The base end of the cable 8a is connected to the base end of the pulling pipe 20 through the connecting unit 22, and the movement of the pulling pipe 20 is transmitted to the distal ends (the right end of FIGS. 1 to 3) of one link arm 26a of a link mechanism 25 to be described below through the cable 8a. In particular, when a braking is started, as the pulling pipe 20 is displaced in a direction of going far away from the link mechanism 25, the cable 8a is pulled in the same direction, and the link mechanism 25 is extended. In this embodiment, when a braking force is applied in this way, an elastic force in the pulling direction is continuously given to the cable 8a.

For this purpose, in the case of the structure of this embodiment, the connecting unit 22 is constructed by a flange part 27, a receiving plate 28, a compression spring 29, and a spring cover 30.

The flange part 27 is provided integrally with the pulling pipe 20 at the base end of the pulling pipe 20, and has an outward flange shape.

The receiving plate 28 is formed of a metal plate which has enough strength and rigidity into a circular wheel shape, and is supported in a state of being prevented from displacing in a direction away from the link mechanism 25 at the base end of the cable 8a. For this purpose, in this embodiment, when the receiving plate 28 is outwardly fitted with a part close to the base end of the cable 8a, a snap ring 31 is crimped and fixed onto a part projecting from the receiving plate 28 at the base end of the cable 8a.

The compression spring 29 is provided between the flange part 27 and the receiving plate 28. When the compression spring 29 is compressed a predetermined amount, the compression spring 29 has such an elastic force that a braking force, which is necessary, is obtained.

The spring cover 30 is formed into a cylindrical shape as a whole with inward flange-like locking parts 32a, 32b at two ends in the axial direction by bending a metal plate which has enough strength and rigidity, and is provided in the actuator case 2a so as to move in the axial direction of the cable 8a. When the flange part 27, the receiving plate 28 and the compression spring 29 are arranged between the two locking parts 32a, 32b, the spring cover 30 is combined with these members 27 to 29. In the combined state, the distance between the flange part 27 and the receiving plate 28 may not be expanded above a predetermined value. Preferably, when the flange part 27 abuts against the inner side surface of the locking part 32a at one side of the spring cover 30 and the receiving plate 28 abuts against the inner side surface of the locking part 32b at the other side of the spring cover 30, the compression spring 29 is lightly compressed (a preload is given to the compression spring 29).

The link mechanism 25 is driven by the electric actuator 1a to expand the distance between the brake shoes 12, 12. The link mechanism 25 that is a toggle type expanding mechanism is provided to be next to the anchor 13. The link mechanism 25 is a structure that is typically carried out traditionally in the technical field of the parking brake of the drum brake, and is made by coupling one pair of link arms 26a, 26b with a pivot shaft 33 to be swing displaceable. One ends in the circumferential direction of the webs 15, 15, which construct the two brake shoes 12, 12 are projected into and abut against the locking recesses respectively formed at central parts of the base end edges of the two link arms 26a, 26b. The base end edges of the two link arms 26a, 26b are opposite to each other.

Furthermore, the parts which are adjacent to the two locking recesses are projected into and abut against parts which are provided at parts fixed to the backing plate 11 and have enough strength and rigidity, and the two link arms 26a, 26b become swing displaceable around the two projected parts as the fulcrums. Among the two link arms 26a, 26b, one link arm 26a is provided to be sandwiched by the other link arm 26b. For this purpose, the other link arm 26b is constructed by folding 180 degrees a metal plate, which becomes the material, at the middle part. The distal end of the cable 8a is coupled to the distal end (the right end in FIGS. 2-3) of the one link arm 26a through a connector 10a and a coupling pin. By pulling the cable 8a, the link mechanism 25 is extended. Because the construction of the coupling part of the cable 8a and the link arm 26a is widely known traditionally, the detailed illustration and explanation are omitted.

After the assembly of the drum brake type electric parking brake apparatus of this embodiment is completed, when a parking brake is operated, the pulling pipe 20 is displaced in the direction away from the link mechanism 25 based on the energization of the electric motor 3a. Then, the flange part 27 provided at the base end of the pulling pipe 20 pushes the receiving plate 28 through the compression spring 29, and the receiving plate 28 pulls the cable 8a through the snap ring 31. As a result, the link mechanism 25 is extended to expand the distance between the ends in the circumferential direction of the two brake shoes 12, 12, the linings 17, 17 of the two brake shoes 12, 12 are pressed against the inner circumferential surface of the drum, and a braking force is produced. In this process, because the compression spring 29 is compressed elastically, the two linings 17, 17 are pressed against the inner circumferential surface of the drum by a force that corresponds to the elasticity of the compression spring 29. When the braking is cancelled, if the electric motor 3a is rotated in the reverse direction, and the pulling pipe 20 is displaced in the direction of approaching the link mechanism 25, by the elasticity of the return springs 19a, 19b, while the distance between the two brake shoes 12, 12 is shortened, the full length of the link mechanism 25 is shortened.

In this way, when the link mechanism 25 is expanded or shortened by axially displacing the pulling pipe 20 to pull the cable 8a with a strong force or cancel the force, the part as the distal end of the one link arm 26a, which pivotally supports the distal end of the connector 10a arcuately moves around the base end of the link arm 26a. The difference between the linear movement of the pulling pipe 20 and the arcuate movement of the distal end of the connector 10a is absorbed by the flexing of the cable 8a. In the case of the drum brake type electric parking brake apparatus of this embodiment, the length of the cable 8a can be well ensured. That is, the cable 8a is connected to the pulling pipe 20 at the end of the spring cover 30 which is extended from the base end of the pulling pipe 20 while the cable 8a is inserted loosely into the inside of the pulling pipe 20. Therefore, the flexibility of the cable 8a can be ensured by increasing the length of the cable 8a, and the following capability to the arcuate movement of the distal end of the one link arm 26a is improved.

Particularly, at the time of a braking, if the tensile force of the cable 8a increases and the cable 8a becomes hard to flex, the distal end (upper end in FIG. 5) of the pulling pipe 20 tends to withdraw from the link mechanism 25, and the distance between the distal end of the pulling pipe 20 and the distal end of the one link arm 26a can be ensured. Furthermore, in this embodiment, the distal end opening of the pulling pipe 20 is formed with a mortar-shaped sloping surface 34 which is so inclined that the inner diameter increases towards the distal end edge. Therefore, the part of the cable 8a that is located at the distal end opening of the pulling pipe 20 can be flexed without receiving a particularly big stress, and can enter into and leave out of the pulling pipe 20 in the flexed state. As a result, a braking can be smoothly performed by the drum brake type electric parking brake apparatus either when the braking is started or when the braking is cancelled.

According to the structure of this embodiment, even if the electric motor 3a just stops while the outer circumferential surfaces of the two linings 17, 17 are pressed against the inner circumferential surface of the drum and, based on the elasticity of the compression spring 29, the force in the pulling direction can be continuously applied to the cable 8a. That is, at the time of a braking, the electric motor 3a stops in a state that the compression spring 29 is compressed to a degree that an elastic force enough to ensure the braking force is produced. In this state, the flange part 27 is separated from the one locking part 32a or the receiving plate 28 is separated from the other locking part 32b. Because the male screw 23 of the outer circumferential surface of the pulling pipe 20 is engaged threadedly with the female screw 24 of the feeding nut 21 irreversibly, the outer circumferential surfaces of the two linings 17, 17 are pressed against the inner circumferential surface of the drum with a force corresponding to the elasticity of the compression spring 29. Even if the state of the two circumferential surfaces deviates from this state to some extent, based on this elasticity, the outer circumferential surfaces of the two linings 17, 17 have been sequentially pressed against the inner circumferential surface of the drum with an enough force.

Therefore, the braking force of the drum brake type electric parking brake apparatus can be prevented from dropping or even disappearing in a short time even when the position relation between the two brake shoes 12, 12 and the drum slightly deviates. In this embodiment, the drum brake of the duo servo type is used. As widely known in the technical field of the drum brake, in the case of the drum brake of the Duo servo type, when the positions of the two brake shoes 12, 12 in the radial direction of the backing plate 11 are constant, the braking force decreases at the moment when the rotating direction of the drum is reversed and the vehicle will move a little. If such a phenomenon occurs when vehicles are conveyed by a carrier car, the phenomenon is not a preferred one because a contact of the carried vehicles should be prevented.

In the case of a typical manual parking brake, the length of the cable is long, and because the cable is extended elastically when the parking brake is operated, with the spring force of the cable itself, the outer circumferential surfaces of the linings of one pair of brake shoes are continuously pushed against the inner circumferential surface of the drum. In contrast, in the case of an electric parking brake apparatus, because the length of the cable is short, the state that the circumferential surfaces strongly abut against each other cannot be maintained as it is with the spring force of the cable itself. In contrast, according to the structure of this embodiment, the state that the circumferential surfaces strongly abut against each other can be maintained as it is with the elasticity of the compression spring 29, and it can be prevented that, for example, vehicles loaded in a carrier car move with the upward or downward movement of a portion of the carrier car.

Furthermore, according to the structure of this embodiment, when the drum brake type electric parking brake apparatus is assembled, the operation of connecting the distal end of the one link arm 26a and the connector 10a can be performed easily. That is, in the case of the structure of this embodiment, the elasticity of the compression spring 29 may be transmitted to the cable 8a through the snap ring 31 which is fixed to the base end of the cable 8a and abuts against one surface (undersurface in FIGS. 5 and 6) of the receiving plate 28. The member which prevents the snap ring 31 from being displaced in the direction away from the receiving plate 28 is only the cable 8a. Therefore, before the distal end of the link arm 26a and the connector 10a are connected, the cable 8a may be displaced in the direction away from the link arm 26a. Thus, at the time of the assembling work, for the electric actuator unit 1a, the pulling pipe 20 is located slightly at the side of the link arm 26a. In this state, if the distal end of the link arm 26a and the connector 10a are connected after the electric actuator unit 1a is attached and fixed to the backing plate 11 and the link mechanism 25 is assembled to the backing plate 11, because the cable 8 is displaced in the direction away from the link arm 26a, without energizing the electric motor 3a, the round holes that are formed in the distal end of the link arm 26a and the connector 10a can be matched with each other. As a result, the operation of connecting the distal end of the link arm 26a and the connector 10a can be easily performed by inserting pins into these round holes.

According to the structure of the drum brake type electric parking brake apparatus of the present invention constructed as described above, the length of the cable that is between the base end of the pulling pipe and the component member of the expanding mechanism can be well ensured. That is, the cable is connected to the base end of the pulling pipe, which is the end opposite to the expanding mechanism among the two ends in the axial direction of the pulling pipe, with the connecting unit while the cable is loosely inserted through the inside of the pulling pipe. Therefore, the length of the cable can be at least increased the length of the pulling pipe in comparison with that a cable is merely between the distal end of the rod and the component member of the extension member, like the above-mentioned structure shown in FIG. 8. As a result, the flexibility of the cable can be ensured (easy to flex), and the following capability to the arcuate movement of the part of the component members of the expanding mechanism is improved. As a result, a braking can be smoothly performed by the drum brake type electric parking brake apparatus either when the braking is started or when the braking is cancelled.

Furthermore, according to the structure of the invention, a force in the pulling direction can be continuously given to the cable based on the elasticity of the compression spring. Therefore, regardless of the structure of the drum brake, the braking force of the drum brake type electric parking brake apparatus can be prevented from dropping or even disappearing in a short time even when the position relation between the pair of brake shoes and the drum slightly deviates.

The present invention is not limited to the drum-in disc brake as illustrated, but can be carried out even in a structure in which both a service brake and a parking brake is carried out with drum brakes. The structure of the drum brake is not limited to the duo servo type as illustrated, but may adopt other structures such as a leading trailing type or a twin leading type.

This patent application is based upon Japanese Patent Application No. 2012-166614 filed on Jul. 27, 2013, the contents of which are incorporated herein by way of reference.

What is claimed is:

1. A drum brake type electric parking brake apparatus for pressing linings of brake shoes against an inner circumferential surface of a drum so as to produce a braking force by expanding an expanding mechanism provided between the brake shoes, the drum brake type electric parking brake apparatus comprising:

an electric actuator unit configured to pull a cable by a speed reducer so as to expand the expanding mechanism, the speed reducer configured to reduce a speed of a rotation of an output shaft of an electric motor provided in an actuator case and to convert the rotation into a linear movement;

a pulling pipe, having a circular tube shape into which the cable is loosely inserted, provided with a male screw on an outer circumferential surface, and supported in the actuator case so as to move in an axial direction thereof;

a feeding nut, provided as a part of components of the speed reducer, supported in the actuator case so as to move in only a rotation direction thereof, and provided with a female screw on an inner circumferential surface which is engaged with the male screw on the outer circumferential surface of the pulling pipe; and a connecting unit, connecting a base end of the pulling pipe and a base end of the cable so as to pull the cable in a direction away from the expanding mechanism with a movement of the pulling pipe in the same direction, the base end of the pulling pipe being an end opposite to the expanding mechanism, and the base end of the cable being projected from the base end of the pulling pipe.

2. The drum brake type electric parking brake apparatus according to claim 1, wherein the connecting unit comprises:

an outward flange-like flange part provided at the base end of the pulling pipe;

a receiving plate supported at the base end of the cable while being prevented from being displaced in the direction away from the expanding mechanism;

a compression spring provided between the receiving plate and the flange part; and a spring cover surrounding the compression spring, and two end parts of the spring cover are respectively engaged to the receiving plate and the flange part so as to prevent a distance between the receiving plate and the flange part from expanding longer than a predetermined value.

3. The drum brake type electric parking brake apparatus according to claim 2, wherein one of the two end parts of the spring cover is engaged to a surface of the receiving plate in an opposite side of the expanding mechanism, and the other of the two end parts of the spring cover is engaged to a surface of the flange part in a side of the expanding mechanism.

* * * * *